Figure 1:
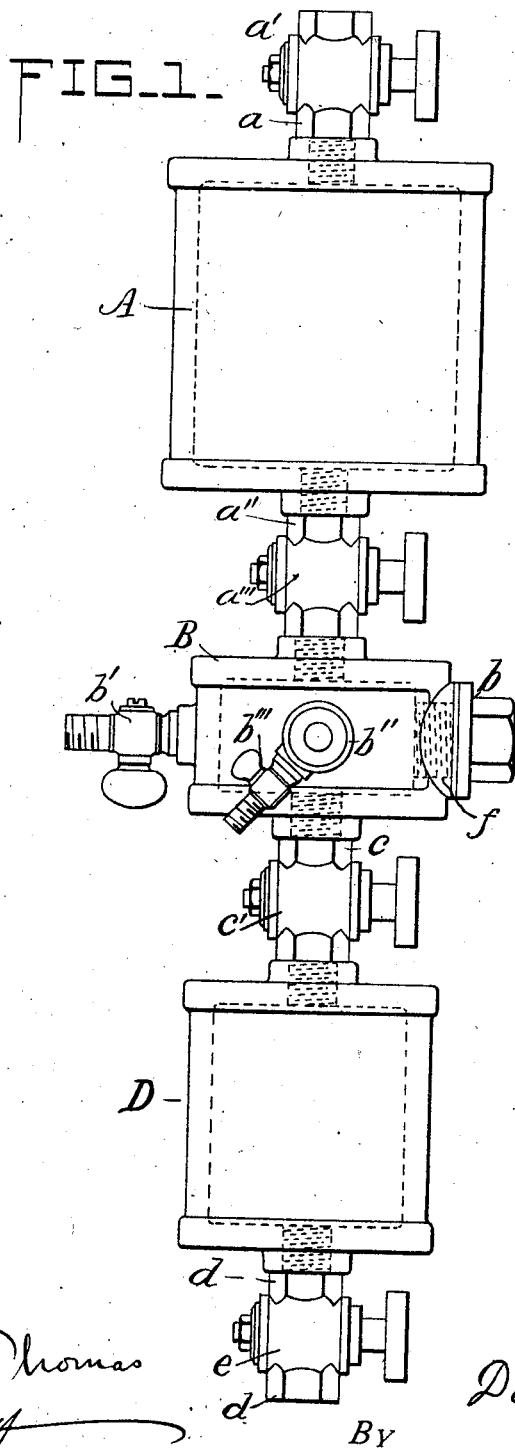

No. 826,089. PATENTED JULY 17, 1906.
D. T. DAY.
PROCESS OF REFINING AND PURIFYING HYDROCARBON OILS.
APPLICATION FILED DEC. 19, 1905.

2 SHEETS—SHEET 1.

WITNESSES:
G. Robert Thomas
Alex. Scott

INVENTOR
David T. Day
E. B. Clark
Attorney

No. 826,089. PATENTED JULY 17, 1906.
D. T. DAY.
PROCESS OF REFINING AND PURIFYING HYDROCARBON OILS.
APPLICATION FILED DEC. 19, 1905.

2 SHEETS—SHEET 2.

WITNESSES

INVENTOR
David T. Day
By E. B. Clark, Attorney

UNITED STATES PATENT OFFICE.

DAVID T. DAY, OF WASHINGTON, DISTRICT OF COLUMBIA.

PROCESS OF REFINING AND PURIFYING HYDROCARBON OILS.

No. 826,089.  Specification of Letters Patent.  Patented July 17, 1906.

Application filed December 19, 1905. Serial No. 292,445.

*To all whom it may concern:*

Be it known that I, DAVID T. DAY, a citizen of the United States, residing at Washington, in the District of Columbia, have invented certain new and useful Improvements in Processes of Refining and Purifying Hydrocarbon Oils, of which the following is a specification.

This invention relates to a method of purifying hydrocarbon oils, and more particularly to a method of treating distillate oils which are of bad odor and deficient in hydrogen.

The object of my invention is to provide for refining and deodorizing hydrocarbon oils and mingle or combine therewith a sufficient percentage of hydrogen to convert the oils into a mixture of the marsh-gas series of hydrocarbons.

In the distillation of petroleum-oils as now generally carried on more or less destructive distillation or cracking of the heavy oil is effected, by which oils relatively poor in hydrogen are obtained and which are characterized by an objectionable odor, also by a tendency to darken in color the whole distillate and to burn badly in lamps. It is also well known that many crude oils are similarly poor in hydrogen and frequently contain asphaltum and other objectionable compounds. It is charactertic of the distillates above mentiond that they can take up additional products or elements, such as sulfuric-acid residues, chlorin, and other elements.

My invention consists in so treating these oils with hydrogen gas or hydrocarbon gas or vapor, such as ethylene and its homologues, or gasolene-vapors under special conditions, hereinafter described, that the disagreeable odor is entirely or in a great part removed and that the burning qualities of the oil in lamps is greatly improved. To effect this result, the oil, such as a distillate produced by high heat and the "cracking" operation or crude oil, is brought, together with hydrogen or an absorbable hydrocarbon gas or vapor, in the presence of a porous absorptive substance, such as palladium-black or platinum sponge, porous zinc-dust, fullers' earth, and other clays. By this means the desired purification and deodorization is effected, probably by the direct addition to or combination of hydrogen or of hydrocarbon gas or vapor with the oil, thus wholly or sufficiently in part replacing the lacking hydrogen and converting the oil into a mixture of the marsh-gas series of hydrocarbons.

Figure 2:
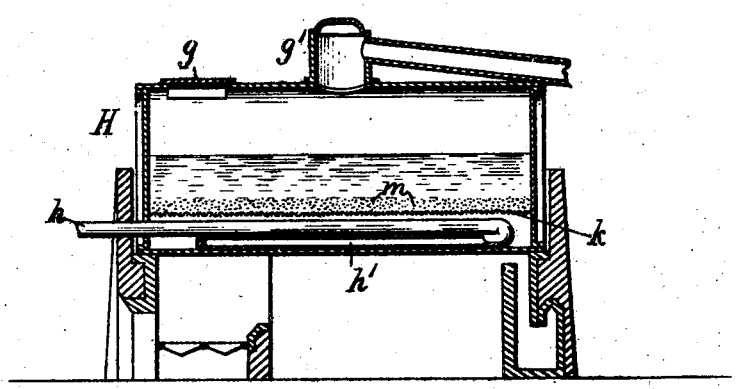

In the accompanying drawings, Figure 1 represents in elevation with parts in section one form of apparatus adapted for carrying out my process. Fig. 2 represents a sectional view of a still and attachments in which my invention may be practiced.

The various vessels or tanks are preferably made of metal and may be of cast-brass tinned or coated with other metal. The oil reservoir or tank A may be of any desired capacity and is provided with an oil-inlet pipe $a$, having a valve $a'$, and with an outlet-pipe $a''$, having a valve $a'''$, and connecting with the treating or hydrogenating chamber B. This chamber is made strong and adapted to withstand a high internal pressure and is provided at one side or end with a filling-opening $f$, into which is fitted a screw-plug $b$. To another side or end is applied a gas-cock $b'$, having a screw-threaded end for attaching a gas or vapor supply pipe. Another short pipe connection $b''$ is provided for attaching a pressure-gage, and such pipe has a lateral cock $b'''$ for connecting an air-pump or exhaust device. In the bottom of chamber B is secured a discharge-pipe $c$, having a valve $c'$ and connecting with the oil-receiving chamber or tank D. To the bottom of tank D is secured a discharge-pipe $d$, having a valve $e$.

In carrying out the process the porous substance may be saturated with hydrogen or light hydrocarbon vapor or hydrocarbon gas under pressure, and the oil to be purified and deodorized may be introduced under similar pressure into the same flask or tank containing the porous substance. The improvement in the quality and odor of the oil will be quickly perceptible.

The valve $a'''$ being closed and valve $a'$ open, the desired quantity of distillate oil to be deodorized and purified is supplied to tank A and then valve $a'$ is closed. The screw-plug $b$ is removed and the desired quantity of porous absorptive substance, preferably palladium-black or platinum sponge, is introduced through opening $f$ into chamber B, the quantity being approximately in proportion to the quantity of oil to be purified. The porous substance may be placed on a wire-cloth screen or on layers of textile fabric. The palladium-black or platinum sponge may be used in the proportion of one-half ounce for each gallon of oil to be treated.

The chamber B having been charged with porous material, the screw-plug $b$ is screwed into opening $f$, tightly closing the same. The air in chamber B is now preferably exhausted through cock $b'''$ or it may be replaced by carbonic-acid or other non-combustible gas admitted through cock $b'$ or $b'''$. Hydrogen gas or ethylene or other hydrogen-carrying gas or vapor is now introduced under pressure through cock $b'$ until the porous material is saturated, as shown by cessation of heat of absorption or by the greatly-increased pressure indicated by a gage. The pressure of hydrogen may vary from normal to one hundred and fifty pounds per square inch or more. A practical pressure is fifty pounds to the square inch. The quantity of hydrogen or hydrogen-carrying gas or vapor to be supplied increases as the pressure, inasmuch as the volume which may be absorbed by a given quantity of palladium-black or platinum sponge or other porous absorptive material is practically constant.

The porous substance having been saturated with hydrogen, the valve $a'''$ is partly opened, (valve $a'$ being closed,) permitting hydrogen to pass up into tank A till an equilibrium is established and then permitting oil to flow slowly from tank A into chamber B in contact with the hydrogen-saturated porous material therein. Valve $c'$ may now be opened, permitting the oil to filter through the porous substance, thereby becoming hydrogenated and deodorized. The purified oil is collected in tank D and may be drawn off as desired by opening valve $e$.

Saturation or impregnation of the palladium-black or platinum sponge with hydrogen may be maintained by pumping in hydrogen-carrying gas or vapor through cock $b'$ into chamber B. The gas may also be supplied under the pressure of generation or by pressure produced in any desired manner.

The palladium-black or platinum sponge is not consumed, and its use and action are continuous so long as it may be desired to conduct the process.

In case the porous absorptive substance becomes clogged with gummy or other residual matter such material may be removed from the treating chamber or vessel and then subjected to a sufficient heat with excess of air to burn out the gum or other foreign matter.

When fullers' earth or other porous absoptive substance is used, it should be in much larger proportions than palladium-black or platinum sponge, such as ten times the quantity of either of them. Otherwise the mode of procedure is substantially the same as above described.

It is true that the treatment takes place with or without pressure, but more economically and more rapidly under high pressure, and the temporary elevation of temperature due to pressure and rapid absorption of hydrogen (either alone or with absorbable hydrocarbons) facilitates the effect desired.

The process may be modified by placing the porous absorptive substance in a still or other vessel to which heat may be applied and a crude oil or a distillate may be supplied to the still or vessel and subjected to distillation. During the distilling operation hydrogen gas or hydrocarbon vapors may be passed through the body of oil and porous substance. An ordinary cylindrical still H is provided with a lid $g$, covering a hand-hole opening and the usual dome $g'$. At or near the bottom of the still is arranged a supply-pipe $h$, having a perforated portion $h'$ for introducing small streams of hydrogen-carrying gas or vapor. Above this perforated pipe is supported a wire-cloth or perforated-plate partition $k$, upon which is placed a layer of porous absorptive material $m$. The porous absorptive material $m$ having been placed upon the partition, hydrogen-carrying gas or vapor is admitted through the perforated pipe $h'$ till the porous material takes up one thousand volumes or more of the gas or vapor. The charge of oil is now placed in the still and subjected to distillation, while at the same time streams of hydrogen-carrying gas or vapor are passed from the pipe $h'$ through the body of oil and the porous absorptive material.

It is not necessary to the success of this invention that all of the petroleum or other hydrocarbon liquid which is subjected to the deodorizing operation becomes saturated with hydrogen; but the beneficial effects will be apparent at once and while only a part of the dydrocarbon under treatment has been saturated with hydrogen or light hydrocarbon gas or vapor.

The hydrogen-carrying gas used in my process may be obtained in any well-known manner and may be a mixture of hydrogen and carbonic oxid and the hydrocarbon vapor or gas (ethylene) may be obtained in any well-known manner. The gas or vapor may be previously heated before being used as above described.

I have found that the best procedure is to let the palladium-black take up the hydrogen (one thousand volumes or more at ordinary pressure and vastly more under greater pressures) and then filter the oil through the palladium-black thus charged with hydrogen and subsequently pump in hydrogen to keep up the charge in the black.

Having described my invention, what I claim, and desire to secure by Letters Patent, is—

1. The process of treating hydrocarbon oils which consists in subjecting them to the action of added hydrogen or absorbable hydrocarbons in the presence of porous absorptive substances, capable of absorbing hydrogen or a hydrogen-carrying gas or vapor.

2. The process of treating hydrocarbon oils which consists in subjecting them to the action of added hydrogen or absorbable hydrocarbon, under pressure, in the presence of porous absorptive substances, capable of absorbing hydrogen or a hydrogen-carrying gas or vapor.

3. The process of purifying and deodorizing hydrocarbon oils which consists in passing them through absorptive porous substances, charged or saturated with absorbable hydrogen-carrying gas or vapor.

4. The process of purifying and deodorizing hydrocarbon oils which consists in subjecting them to the action of palladium-black, or platinum sponge charged with hydrogen or absorbable hydrogen-carrying gas or vapor.

5. The process of purifying and deodorizing bad-smelling hydrocarbon oils, deficient in hydrogen, which consists in filtering them through palladium-black or platinum sponge charged with hydrogen or absorbable hydrogen-carrying gas or vapor, and maintaining the supply of such gas or vapor in contact with the porous absorptive material during the filtering operation.

In testimony whereof I affix my signature in presence of two witnesses.

DAVID T. DAY.

Witnesses:
FREDERICK W. HORTON,
BELLE HILL.